United States Patent [19]

Haneda

[11] Patent Number: 4,931,336
[45] Date of Patent: Jun. 5, 1990

[54] INFORMATION RECORDING MEDIUM AND METHOD OF OPTICALLY RECORDING INFORMATION EMPLOYING THE SAME

[75] Inventor: Norihisa Haneda, Shizuoka, Japan

[73] Assignee: Fuji Photo Film Co., Ltd., Kanagawa, Japan

[21] Appl. No.: 297,565

[22] Filed: Jan. 17, 1989

[30] Foreign Application Priority Data

Jan. 18, 1988 [JP] Japan ............................ 63-8048
Jun. 15, 1988 [JP] Japan .......................... 63-149055

[51] Int. Cl.$^5$ .............................................. B32B 3/02
[52] U.S. Cl. .................................... 428/64; 428/65; 428/913; 430/945; 346/76 L; 346/35.1; 369/272; 369/277
[58] Field of Search ............ 369/272, 277; 428/64, 428/65, 913; 430/945; 346/76 L, 135.1

[56] References Cited

FOREIGN PATENT DOCUMENTS 160844 9/1984 Japan .
2080560 2/1982 United Kingdom .

Primary Examiner—Patrick Ryan
Attorney, Agent, or Firm—Sixbey, Friedman, Leedom & Ferguson

[57] ABSTRACT

An information recording medium comprises a disc-shaped substrate provided with a concave groove of spiral form on the surface and a recording layer for optically recording and reproducing information by means of a laser beam which is provided on the substrate, and both corner portions and top portions of both side walls facing each other in the concave groove are radiused. The information recording medium may further compries an intermediate layer between the substrate and the recording layer. A method of optically recording information using the information recording medium is also disclosed.

6 Claims, 3 Drawing Sheets

INFORMATION RECORDING MEDIUM AND METHOD OF OPTICALLY RECORDING INFORMATION EMPLOYING THE SAME

BACKGROUND OF THE INVENTION

1. Field of the invention

The present invention relates to an information recording medium which is advantageously employed for recording or reproducing optical information by means of a laser beam of high energy density and a method of optically recording information using said information recording medium.

2. Description of prior art

Information recording media utilizing a beam of high energy density such as a laser beam have been developed in recent years and are now put into practical use. Such recording medium is generally called "optical disc", and the practical applications thereof have been found, for example, as a video disc and an audio disc as well as a disc memory for a large-capacity computer and a large-capacity static image file. Among these media, a compact disc (referred to as "CD") is now widely used as an audio disc for reproducing a music or the like.

The compact disc (CD) for reproduction of information only is generally rotated at a fixed linear speed of 1.2 to 1.4 m/sec., according to the predetermined CD standard to read out (reproduce) the recorded information therefrom, and CD is required to allow a long recording time (up to 74 min.) using a signal-recording area within the region between inner diameter of 45 mm and outer diameter of 116 mm under the conditions of pit width of 0.8 $\mu$m and track pitch of 1.6 $\mu$m. The conventional audio compact disc is used only for reproduction. Such compact disc has been beforehand provided with pits on the substrate (accordingly not provided with an independent recording layer), so that the compact disc has such problems that information cannot be recorded or edited thereon on the users' side. Accordingly, development of a compact disc of DRAW (Direct Read After Write) type (i.e., disc capable of being written) is required, and some compact discs of DRAW type have been put into practical use. The above requirement is also addressed to discs for memorizing various documents, data, static image files, etc., discs of DRAW type for CD-ROM (Read Only Memory) or CD-I (Interactive).

The information recording medium (optical disc) of DRAW type has been already known, and the information recording medium basically comprises a disc-shaped transparent substrate made of plastic or glass material and a recording layer made of metal or semimetal such as Bi, Sn, In and Te provided on the substrate. The recording layer may be made of other material such as dye. Writing of information on the optical disc can be conducted, for example, by irradiating the medium with a laser beam. Under irradiation with the laser beam, the irradiated area of the recording layer of the disc absorbs energy of the beam and rise of temperature locally occurs, and as a result, chemical and physical change is caused to alter optical characteristics of the recording layer in the irradiated area, whereby recording of information can be made. Reading of information from the optical disc is also conducted by irradiating the disc with a laser beam. The recorded information can be reproduced by detecting a reflected light or a transmitted light corresponding to the alteration of the optical characteristics of the recording layer.

In the known information recording media of DRAW type, the information cannot be recorded unless the medium is rotated at a high linear speed. Therefore, it is required to have wide spaces between adjoining pits for the recording, and hence it is almost impossible to record information thereon according to the CD system in which high density recording is made at a low linear speed. Even if the conventional DRAW type recording medium would record information thereon, the recorded information could not be read out therefrom by means of a commercially available CD player, because the commercially available CD player can read only an optical disc having a high reflectance for a light for reproduction such as a laser beam.

As described above, writing of information on the optical disc or reading of information from the optical disc is generally conducted by irradiating a predetermined portion of the disc surface with a laser beam. Recently, as a large amount of information is desired to be recorded on one optical disc, it has been proposed to increase density of the units for record of information in the form of such as pits in recording area of the disc. However, the increase of density of the recording units causes difficulty in precisely irradiating the pre-determined portion of the disc with a laser beam, so that optical discs in recent years generally have on their surfaces a tracking guide in the form of spiral concave groove (i.e., pre-groove) as shown in FIG. 1 of attached drawings for precisely guiding the laser beam to the pre-determined irradiation area (generally referred to as "tracking"). The tracking guide of such form is generally arranged on optical discs of CD format.

In the case that the concave groove is provided on an optical disc, the difference between the amount of a reflected light in the area where pits are formed and that of a reflected light in the area where pits are not formed can be made larger, so that such groove is of great value for known optical discs (especially for optical discs according to International Organization for Standardization (ISO)), and usually provided on those discs. For reproducing information from an optical disc of CD format, a commercially available CD player is required, and hence the optical disc should show a high reflectance during the reproducing procedure. However, in the above-mentioned concave groove, the irradiated laser beam is apt to be diffracted, and hence a required large amount of the reflected light is hardly received by a receptor of the CD player. Accordingly, it is difficult to obtain a sufficiently high reflectance using a tracking guide in the form of the above-mentioned conventional concave groove.

SUMMARY OF THE INVENTION

It is an object of the present invention to provide an information recording medium of DRAW type provided with a tracking guide for recording information by irradiation with light which has a high reflectance on the groove portion and is improved in C/N ratio and tracking property in the recording or reproducing procedures of information.

It is another object of the invention to provide an information recording medium of DRAW type provided with a tracking guide which can be well recorded with signals of CD format and from which the recorded signals can be easily reproduced by means of a commercially available CD player.

It is a further object of the invention to provide an information recording medium by which groove signals can be precisely obtained independent of materials of the substrate and the intermediate layer.

It is a still further object of the invention to provide a method of optically recording information recorded on the above information recording medium, particularly a method of optically recording information of CD format signals on the above recording medium.

There are provided by the present invention:

(1) an information recording medium comprising a disc-shaped substrate provided with a sprirally formed concave groove on its surface and a recording layer for optically recording or reproducing information by means of a laser beam which is provided on the substrate, wherein both corner portions facing each other and top portions of both side walls facing each other in said concave groove are radiused (that is, made in the form of an arc);

(2) a method of optically recording information on the information recording medium of (1) above by irradiating a bottom surface of the concave groove having the recording layer thereon with a laser beam through the substrate under rotating the recording medium at a fixed linear speed; and (3) a medium recorded with information on the recording layer of the information recording medium of (1) above by locally removing a material of the recording layer to form pits or locally altering optical characteristics of the material of the recording layer.

There are also provided by the invention:

(4) an information recording medium comprising a disc-shaped substrate provided with a spirally formed concave groove on its surface, an intermediate layer provided on the upper surface with a concave groove of essentially the same form as that on the substrate and a recording layer for optically recording or reproducing information by means of a laser beam, superposed in order, wherein both corner portions facing each other and top portions of both side walls facing each other in both of the concave grooves on the substrate and the intermediate layer are radiused;

(5) a method of optically recording information on the information recording medium of (4) above by irradiating a bottom surface of the concave groove having the recording layer thereon with a laser beam through the substrate under rotating the recording medium at a fixed linear speed; and (6) a medium recorded with information on the recording layer of the information recording medium of (4) above by locally removing a material of the recording layer to form pits or locally altering optical characteristics of the material of the recording layer.

Preferred embodiments of the above-mentioned information recording media of the present invention are as follows:

(1) the information recording medium characterized in that the bottom surface of the concave groove has a plane portion;

(2) the information recording medium characterized in that the shape of the concave groove in the direction of a diameter of the substrate is determined by the following formulae (I) and (II):

$$Wu \geqq Wc + d \cdot \tan(90 - \theta) \quad (I)$$

$$Wl \leqq Wc - d \cdot \tan(90 - \theta) \quad (II)$$

in which each symbol has the following meaning:

d: depth of the concave groove from the bottom surface of the groove to the top portion of the wall of the groove;

Wu: width of the concave groove at height of 90% of the depth of the groove from the bottom surface of the groove;

Wl: width of the concave groove at height of 10% of the depth of the groove from the bottom surface of the groove;

Wc: width of the concave groove at height of 50% of the depth of the groove from the bottom surface of the groove; and $\theta$: angle formed by a tangent of the bottom surface of the concave groove at the center position and a tangent of the side wall of the groove at the center position;

(3) the information recording medium characterized in that the section of the concave groove in the direction of a diameter of the substrate has a depth (d) ranging from 200 to 600 angstroms, a width (Wc) ranging from 0.6 to 1.4 $\mu$m, a length of a linear portion of the bottom surface ranging from 0.2 to 0.8 $\mu$m and a distance between two center points on adjacent land portions among the concave grooves ranging from 1.3 to 1.9 $\mu$m; and (4) the information recording medium characterized in that the disc-shaped substrate is made of an acrylic resin or a polycarbonate resin.

Preferred embodiments of the information recording media (4) and (6) of the present invention are as follows:

(1) the information recording medium characterized in that the sectional shape of any of the corner portions and top portions of the side walls in the concave groove on the intermediate layer in a direction of a diameter of the substrate is an arc having a curvature radius of $2 \times 10^2$ to $2 \times 10^4$ angstroms.

Preferred embodiments of the methods (2) and (5) of the present invention are as follows:

(1) the method characterized in that recording of information is conducted by irradiating the bottom surface of the concave groove having the recording layer thereon with a laser beam under rotating the recording medium at a fixed linear speed of 1.2 to 2.8 m/sec.;

(2) the method characterized in that recording of EFM signals of CD format is conducted by irradiating the bottom surface of the concave groove having the recording layer thereon with a laser beam under rotating the recording medium at a fixed linear speed.

The information recording medium of the invention has a prominently higher reflectance on a tracking guide (i.e., pre-groove, composed of concave grooves and land portions) as compared with conventional information recording media of similar type provided with pre-groove. In more detail, the recording medium of the invention is provided with a tracking guide of specific shape (i.e., a tracking guide having arc-shaped (i.e., radiused or round) corner portions), in contrast to the conventional optical recording media. Owing to the tracking guide of the specific shape, the reflectance within the concave groove is made nearer to that on the land portion (i.e., area between concave grooves). Further, in the case that the bottom surface of the concave groove has a plane portion on its center, a relatively high smoothness can be assured on the bottom surface, so that the tracking property hardly deteriorates even if the reflectance within the groove increases. Furthermore, in the case that an intermediate layer is provided between the substrate and the recording layer, inevitablly formed extremely small sized protruded and depressed portions existing on the surface of the groove are almost eliminated, and hence the resulting recording medium hardly suffers occurrence of noise in the recording or reproducing procedure.

In the information recording medium provided with an intermediate layer between the substrate and the recording layer according to the invention, any of the corner portions and top portions in the concave grooves on the substrate and on the intermediate layer are radiused, whereby the thickness of the intermediate layer is almost uniform and particularly troublesome variation is not observed in the thickness of the intermediate layer on the corner portions of the concave groove. Accordingly, possible difference of reflectance between the substrate material and the material of the intermediate layer can be made uniform throughout the recording area. Hence, the information recording medium of the invention is almost free from adverse effect possibly caused by any difference between reflectance of the substrate and that of the intermediate layer material, and therefore occurrence of errors in the access time and occurrence of tracking errors are prominently reduced. Further, lowering of the C/N ratio of the recorded signals caused by the decrease of reflectance on the groove hardly takes place.

Accordingly, when information is recorded or reproduced using the information recording medium of the present invention in which a recording layer is provided on the tracking guide of the specific form, the reflectance within the groove is prominently high and excellent tracking properties can be obtained in the recording or reproducing procedure. Further, in the case that the intermediate layer is provided in the recording medium, occurrence of noise or occurrence of access error is prominently reduced.

Especially in the case of recording EFM signals of CD format on the recording layer of the recording medium of the invention, the recorded signals can be reliably reproduced using a commercially available CD player, because the reflectance in the reproducing procedure is high as described above. Further, the C/N ratio in the reproducing procedure can be enhanced because of the high reflectance. If the tracking control is made by a push-pull tracking method in the reproduction procedure, a margin of the push-pull signals for the shape of the groove can be increased.

Figure 2:
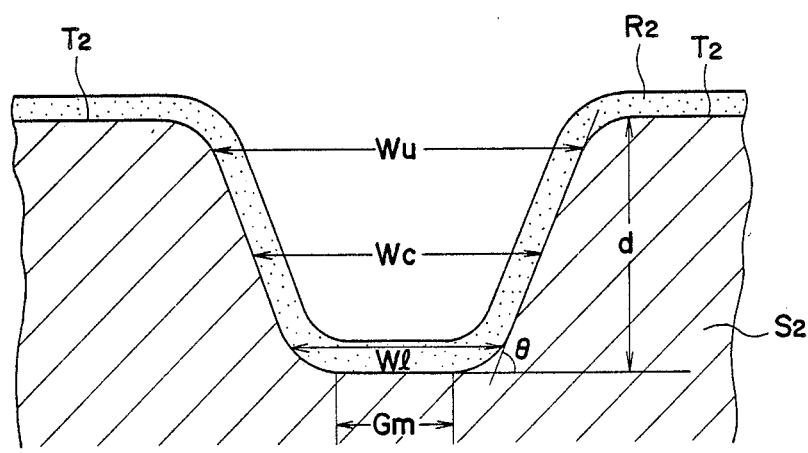
Figure 4:
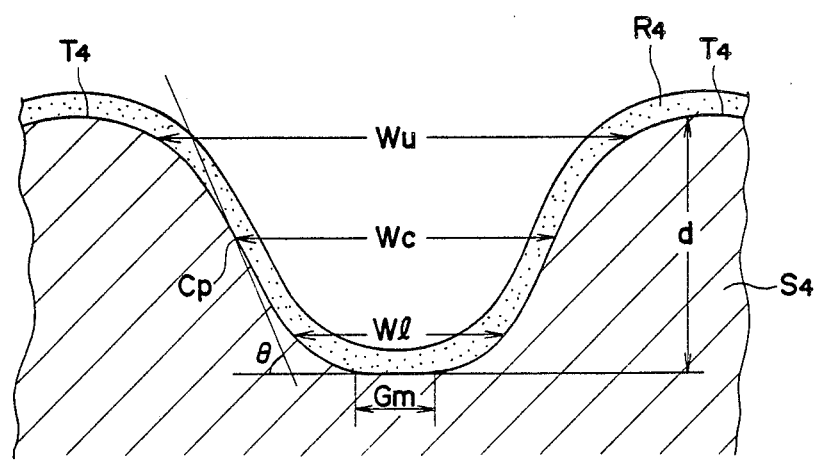

Each of FIGS. 2 and 4 is a schematic view illustrating a section of a substrate provided with a tracking guide wherein the corner portions and top portions of side walls in the concave groove are radiused to form an arc which is employable for the information recording medium of the present invention.

Figure 3:
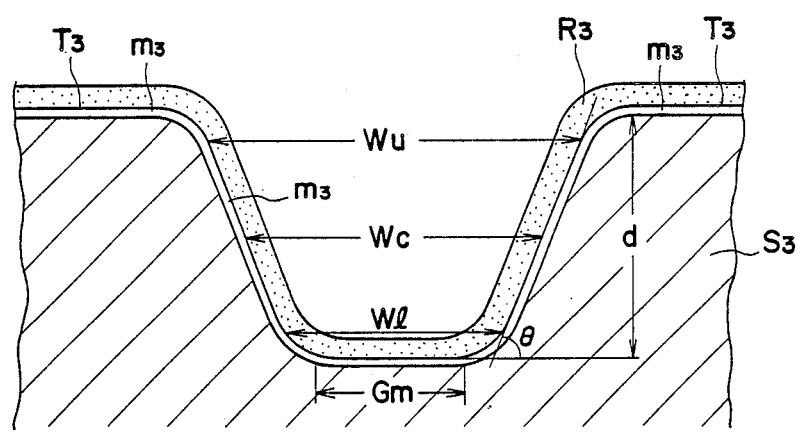
Figure 5:
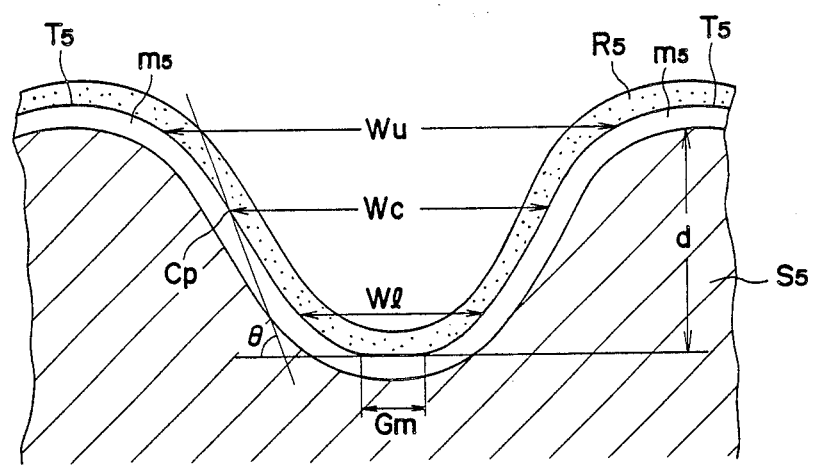

Each of FIGS. 3 and 5 is a schematic view illustrating a section of a substrate having an intermediate layer thereon which is provided with a tracking guide wherein the corner portions and top portions of side walls in the concave groove are radiused to form an arc which is employable for the information recording medium of the present invention.

DETAILED DESCRIPTION OF THE INVENTION

Figure 1:
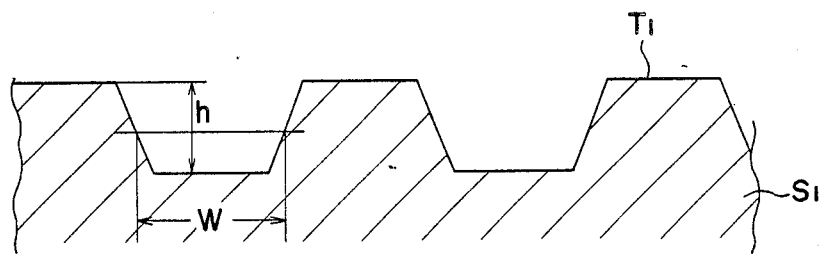
FIG. 1 is a schematic view illustrating a section of a substrate provided with a conventional tracking guide which is employed for known information recording media.

A conventional information recording medium for optically recording or reproducing digital signals is provided with a tracking guide comprising concave grooves shown in FIG. 1. In FIG. 1, $S_1$, $T_1$, w and h indicate a substrate, a tracking guide, a width of a concave groove at the half-depth position of the depth of the groove, and a depth of the concave groove, respectively. The the formation of a tracking guide shown in FIG. 1 is advantageous because the difference between the amount of a reflected light on the land portion (between the concave grooves) and that of a reflected light within the groove can be made large and a high C/N (ratio) can be obtained. However, the irradiated laser beam is apt to diffract, resulting in a great loss of the reflected light, so that the tracking guide of such shape is not always employed advantageously for an information recording medium of CD format. EFM signals of CD format recorded on an information recording medium are required to be reproduced using a commercially available CD player, and hence the recording medium is required to have a high reflectance for the reproduction of the recorded signals. In the case that an intermediate layer is provided on the substrate having the above-mentioned grooves for the enhancement of the recording sensitivity, the thickness of the intermediate layer largely varies as described hereinbefore, and hence the resulting recording medium is apt to be influenced by adverse effect caused by the difference between reflectance of the substrate and that of the intermediate layer material, resulting in flactuation of the groove signals.

The information recording medium of the invention well meets the above requirement. The recording medium of the invention comprises a disc-shaped substrate provided with a tracking guide consisting of concave grooves and land portions and a recording layer for optically recording and reproducing information by means of a laser beam which is provided on the substrate. The recording medium of the invention may be provided with an intermediate layer having the same tracking guide between the above disc-shaped substrate and the above recording layer. The recording medium of the invention is characterized in that any of both corner portions facing each other and top portions of both side walls facing each other in the concave groove of the tracking guide is radiused to form an arc. In the case of the recording medium provided with the intermediate layer, any of both corner portions facing each other and top portions of both side walls facing each other in both of the concave grooves existing on the substrate and the intermediate layer is radiused to form an arc. Preferably, the bottom surface of the concave groove has a plane portion. The information recording medium of the present invention is of great value especially for recording EFM signals of CD format.

The tracking guide whose groove has the radiused corner portions and the radiused top portions of the side walls has such a section in the direction of a diameter of the substrate as shown in FIGS. 2 to 5. FIGS. 2 and 3 illustrate embodiments of the tracking guide in which the land portion and the groove are relatively linear, while FIGS. 4 and 5 illustrate embodiments of the tracking guide in which the land portion and the groove are relatively curved, only the center portion of the bottom surface of the groove is linear, and an inflection point of the curve is located on the wall of the groove at the half-depth position of the depth of the groove.

In FIG. 2 or 4, the tracking guide is provided on the substrate, while in FIG. 3 or 5, the tracking guide is provided on the intermediate layer.

FIG. 2 illustrates a section of a tracking guide $T_2$ in the direction of a diameter of the substrate, which is formed on the interface between a substrate $S_2$ and a recording layer $R_2$ provided on the substrate. In FIG. 2, Gm indicates a linear portion of the bottom surface of the concave groove, "d" indicates a depth of the concave groove from the bottom surface of the groove to the center point of the land, "Wu" indicates a width of the concave groove at height of 90% of the depth of the groove from the bottom surface of the groove, "Wl" indicates a width of the concave groove at height of 10% of the depth of the groove from the bottom surface of the groove, "Wc" indicates a width of the concave groove at the position of 50% of the depth of the groove from the bottom surface of the groove (i.e., at the half-depth position of the depth of the groove), and "$\theta$" indicates an angle formed by a tangent of the bottom surface of the groove at the center position and a tangent of the wall of the groove at the center position.

FIG. 3 illustrates a section of a tracking guide $T_3$ in the direction of a diameter of the substrate, which is formed by an interface between an intermediate layer $m_3$ provided on a substrate $S_3$ and a recording layer $R_3$ provided on the intermediate layer. Gm, d, Wu, Wl, Wc and $\theta$ in FIG. 3 have the same meanings as those defined in FIG. 2.

FIG. 4 illustrates a section of a tracking guide $T_4$ in the direction of a diameter of the substrate, which is formed by an interface between a substrate $S_4$ and a recording layer $R_4$ provided on the substrate. Gm, d, Wu, Wl, Wc and in FIG. 4 have the same meanings as those defined in FIG. 2. As is apparent from FIG. 4, the land portion and the groove of the tracking guide $T^4$ both are almost curved and only the center portion of the bottom surface of the groove is linear. Further, an inflection point Cp of the curve is located on the wall of the groove at the half-depth position of the depth of the groove.

FIG. 5 illustrates a section of a tracking guide $T_5$ in the direction of a diameter of the substrate, which is formed on an interface between an intermediate layer $m5$ provided on a substrate $S_5$ and a recording layer $R_5$ provided on the intermediate layer. Gm, d, Wu, Wl, Wc and in FIG. 5 have the same meanings as those defined in FIG. 2. As is apparent from FIG. 5, the tracking guide $T_5$ provided on the intermediate layer $m_5$ has the same sectional shape as that of the tracking guide $T_4$ in FIG. 4. In other words, the land portion and the groove of the tracking guide $T_5$ are almost curved and only the center portion of the bottom surface of the groove is linear. Further, an inflection point Cp of the curve is located on the wall of the groove at the half-depth position of the depth of the groove.

The values of d, Wu, Wl, Wc and $\theta$ shown in each of FIGS. 2 to 5 are preferably values satisfying the following formulae (I) and (II):

$$Wu \geq Wc + d \cdot \tan(90 - \theta) \quad (I)$$

$$Wl \leq Wc - d \cdot \tan(90 - \theta) \quad (II)$$

As is apparent from the above formulae, the width (Wu) of the concave groove at height of 90% of the depth of the groove from the bottom surface of the groove is larger than the width (Wl) of the concave groove at height of 10% of the depth of the groove from the bottom surface of the groove. Accordingly, it is preferred that the groove is in the form of reverse trapezoid and any of the corner portions and top portions of the side walls in the groove is radiused, whereby the resulting recording medium has a high reflectance in the information reproduction procedure. However, if Wu is too larger as compared with Wl, the tracking accuracy lowers. Hence, the values of Wu and Wl preferably are values satisfying the following formula:

$$Wu \leq 5 \times Wl$$

In the above-mentioned tracking guide, the depth (d) of the concave groove is preferably in the range of 200 to 600 angstroms, the width (Wc) of the groove is preferably in the range of 0.6 to 1.4 $\mu$m, the length (Gm) of the linear portion of the bottom surface of the concave groove is preferably in the range of 0.2 to 0.8 $\mu$m, and the distance between two center points on the land portions among the grooves is preferably in the range of 1.3 to 1.9 $\mu$m, more preferably 1.5 to 1.7 $\mu$m.

In the case of providing an intermediate layer on the substrate as shown in FIGS. 3 and 5, the sectional shape of any corner portions and any top portions of the side walls in the concave groove on the intermediate layer in the direction of a diameter of the substrate is preferably in the form an arc having a curvature radius of $2 \times 10^2$ to $2 \times 10^4$ angstroms. Thus, excellent tracking property can be obtained.

The tracking guide according to the invention is necessarily provided on a layer which is in contact with the recording layer, and any additional layer such as an undercoating layer or a protective layer may be provided between the intermediate layer and the substrate.

As is apparent from FIGS. 2 to 5, the tracking guide according to the invention has radiused corner portions and radiused top portions of the side walls (that is, the tracking guide has round corner portions). Owing to such specific shape, the reflectance within the groove can be made near to the reflectance on the land portion. Particularly, in the case that the bottom surface of the concave groove has a plane portion in the center, a relatively high smoothness is assured on the bottom surface of the groove, and therefore deterioration of the tracking property is hardly observed even if the reflectance of the groove increases. Further, in the case of providing the intermediate layer on the substrate, extremely small sized protruded and depressed portions existing on the surface of the groove are almost eliminated owing to the intermediate layer, so that occurrence of noise can be reduced in the recording or reproducing procedure.

In the information recording medium provided with the intermediate layer between the substrate and the recording layer according to the invention, any of the corner portions and top portions of the side walls in the concave grooves on the substrate and the intermediate layer is radiused to form of an arc, whereby the thickness of the intermediate layer is almost uniform, and particularly a steep variation in the thickness of the intermediate layer is hardly observed on the corner portions of the concave groove. Accordingly, possible difference of reflectance between the substrate material and the material of the intermediate layer can be made uniform throughout the recording area. Hence, the information recording medium of the invention is almost free from adverse effect possibly caused by any difference between reflectance of the substrate and that of the intermediate layer material. Thus, occurrence of errors in the access time and occurrence of tracking errors are prominently reduced. Moreover, the decrease of C/N ratio of the recorded signals caused by the decrease of reflectance of the groove hardly takes place.

Accordingly, in the case that information is recorded or reproduced using the information recording medium of the present invention in which a recording layer is provided on the tracking guide of specific form, a high reflectance can be obtained on the groove and excellent tracking property is obtained in the recording or reproducing procedure. Further, when the intermediate layer is provided in the recording medium, occurrence of noise or occurrence of access error is prominently reduced in the recording or reproducing procedure.

Especially in the case that EFM signals of CD format is recorded on the recording layer, the recorded signals can be reproduced by means of a commercially available CD player, and a C/N ratio increases in the reproducing procedure owing to the above-mentioned high reflectance in the reproducing procedure. Moreover, when the tracking control is made utilizing a push-pull tracking method in the reproduction procedure, a margin of the push-pull signals for the shape of the groove can be enhanced.

Furthermore, when the intermediate layer is provided on the substrate to avoid an escape of heat energy of the laser beam from the recording layer, pits of almost oval and uniform shape can be formed on the recording layer in the recording procedure, so that the sensitivity of the resulting recording medium can be enhanced and jitter can be made small.

The information recording medium of the invention can be prepared, for example, by the following process.

The substrate having a tracking guide (i.e., a pre-groove) thereon can be prepared by molding a plastic material such as a polycarbonate resin and a polyacrylic resin or laminating a resin layer having a pre-groove on an appropriate substrate such as a plastic plate or a glass plate, and those processes are generally known.

The substrate or the intermediate layer having the tracking guide thereon employable in the present invention has such a section as shown in FIGS. 2 to 5. The substrate or the intermediate layer having such sectional shape can be prepared in the following manner.

In the method which is generally utilized for forming a conventional tracking guide of rectangular form, an appropriate plastic material is molded using for example a stamper having radiused corner portions. For preparing the stamper of such shape, a known stamper is coated with a photoresist, etc., and the photoresist is irradiated with a laser beam to give a desired shape, developed, and then the stamper is produced from the substrate. In the preparation of the stamper, a laser power, developing time or the like is appropriately controlled to appropriately determine the shape of the tracking guide or the degree of radius of the corner portions. As other method, a ultraviolet rays-curing resin may be coated on the substrate to directly form a pre-groove on the substrate. Thus, a substrate having the tracking guide employable in the invention can be prepared.

In the provision of the intermediate layer having the above-mentioned tracking guide of specific form on the substrate, the specific surface condition of the substrate is required to be not spoiled. The intermediate layer can be formed on the substrate utilizing a coating method or a deposition method.

As a method other than the above-mentioned ones, there can be employed a method comprising preparing a plastic substrate having a conventional tracking guide of rectangular form thereon through the aforementioned molding process and then swelling or dissolving the substrate with a specific organic solvent. In more detail, the plastic substrate is coated with the specific organic solvent to dissolve the land portion and the corner portions of the groove walls. The dissolved plastic flows towards the corner portions of the bottom surface of the groove and remains thereon to form a tracking guide having radiused corner portions. Otherwise, the surface of the substrate is made swollen by the organic solvent and then shrinked by evaporation of the solvent to form a tracking guide having radiused corner portions. In the invention, the tracking guide of the specific form can be formed by one or both of those functions depending on the employed substrate and solvent.

In more detail, the tracking guide having radiused corner portions and radiused top portions of the side walls can be formed using the specific solvent (described hereinafter) to obtain a specific substrate employable in the invention. The intermediate layer having the tracking guide thereon can be prepared by dissolving an intermediate layer-forming material (i.e., polymer material) in an organic solvent which hardly dissolves the substrate to prepare a coating solution, and coating the solution on the substrate. Otherwise, the polymer material can be directly vapor-deposited on the substrate through a known deposition method. Alternatively, the provision of the intermediate layer having the tracking guide may be conducted simultaneously with making the corner portions and top portions of the side walls of the tracking guide in the form of an arc by using the above-mentioned specific organic solvent.

From the viewpoint of shortening the process for the preparation of the intermediate layer having the tracking guide, it is preferred and advantageous to simultaneously perform the procedure for providing the intermediate layer and the procedure for making the corner portions and the top portions of the side walls of the tracking guide. In this method, however, it is required that the coating solution for the formation of the intermediate layer is evenly coated on the substrate and at the same time the solution dissolves the substrate to make the desired portions in the form an arc. This method can be also applied to the case of preparing the aforementioned specific substrate having the tracking guide of specific form.

The specific organic solvent is a mixture of an organic solvent (A) which can swell or dissolve a plastic substrate and an organic solvent (B) which does not swell or dissolve the plastic substrate. These two kinds of solvents are appropriately mixed mainly depending on the solubility of the employed plastic substrate.

Examples of the organic solvents (A) include aromatic hydrocarbons such as toluene and xylene, ketones such as methyl ethyl ketone, esters such as ethyl acetate, halogenated hydrocarbons such as dichloroethane, cellosolves such as methyl cellosolve, and organic compounds having a nitro group, a nitril group or an amide group.

Examples of the organic solvents (B) include aliphatic hydrocarbons such as cyclohexane, alcohols such as ethanol, and ethers such as isopropyl ether.

In a mixture of the organic solvent (A) and the organic solvent (B) is dissolved an intermediate layer-forming material (polymer material, described hereinafter) to prepare a coating solution for the formation of an intermediate layer. The coating solution is applied onto the substrate to swell or dissolve the substrate so as to form a tracking guide of the specific form simultaneously with to form an intermediate layer. The combination of the solvents (A) and (B) is optionally determined according to the nature of the substrate and the nature of the polymer material.

The coating can be conducted by a known coating process which is conventionally employed for forming an undercoating layer or a dye type-recording layer. That is, the coating solution of the formation of an intermediate layer is coated on a tracking guide using a spin coater, etc. to make the corner portions and top portions of the side walls of the tracking guide in the form of an arc and simultaneously to form an intermediate layer on the substrate.

When the procedure of radiusing the corner portions and the top portions of the side walls of the tracking guide and the procedure of forming the intermediate layer are simultaneously performed as described above, not only the tracking guide on the intermediate layer (i.e., interface between the intermediate layer and the recording layer) but also the concave groove (interface) between the substrate and the intermediate layer can be radiused in the desired portions. In more detail, when on the plastic substrate is coated the coating solution containing an intermediate layer-forming material dissolved in the organic solvent capable of dissolving the substrate, the solution dissolves the top portions of the side walls of the groove to make those portions in the form an arc in the same manner as described above. A portion of the intermediate layer-forming material and the dissolved plastic still remains thereon, while other portions flow towards the corner portions of the groove and remains thereon, whereby the groove on the substrate (i.e., interface between the substrate and the intermediate layer) is made in the form an arc on the corner portions and the top portions of the side walls, and at the same time, a tracking guide of desired shape is formed on the intermediate layer. Alternatively, the surface of the substrate is swollen by the above solvent of the coating solution and then shrinked through evaporation of the solvent to make the concave groove on the substrate in the form an arc on the corner portions and the top portions of the side walls. At the same time, the coated layer of the solution is dried to form an intermediate layer on the substrate. Thus, the concave groove of desired shape on the substrate and the tracking guide of desired shape on the intermediate layer can be formed simultaneously. The groove on the substrate and the tracking guide on the intermediate layer are made in the desired shape owing to any one or both of the above-mentioned functions depending on the compositions of the substrate and the solvent, but it is assumed that the former case contributes more largely than the latter case in the present invention.

As described above, in the recording medium provided with the intermediate layer having the tracking guide according to the invention, the concave groove formed by the interface between the substrate and the intermediate layer and the tracking guide on the intermediate layer are both radiused on the corner portions and the top portions of the side walls. In this case, accordingly, the thickness of the intermediate layer is almost uniform and hardly suffer from troublesome variation, as compared with the case in which the concave groove formed by the interface between the substrate and the intermediate layer still remains the initial shape (i.e., conventional case). Particularly, the thickness of the intermediate layer hardly varies on the corner portions of the bottom surface of the groove and the top portions of the side walls of the groove. Hence, possible difference of reflectance between the substrate material and material of the intermediate layer can be made uniform throughout the recording area. Hence, the information recording medium of the invention is almost free from adverse effect possibly caused by any difference between reflectance of the substrate and that of the intermediate layer material. As a result, the groove signals hardly vary, so that occurrence of errors in the access time or occurrence of tracking errors is prominently reduced. Moreover, lowering of the reflectance caused by the above-mentioned difference of the reflectance hardly occur, and thereby the decrease of the C/N ratio is hardly brought about.

Accordingly, the information recording medium provided with the intermediate layer according to the invention is almost free from an adverse effect caused by the difference between the reflectance of the substrate material and that of the intermediate layer material, and hence occurrence of errors in the access time and occurrence of tracking errors are prominently reduced. In addition, decrease of the C/N ratio of the recorded signals caused by lowering of the reflectance on the groove is hardly brought about.

Examples of the intermediate layers provided on the substrate include the above-mentioned heat insulating layer, a light-reflecting layer and a sensitivity-increasing layer (gas-generating layer).

The heat insulating layer can be prepared, for example, by a process comprising dissolving a polymer material (e.g., polymethyl methacrylate, acrylic acidmethacrylic acid copolymer, styrene-maleic anhydride copolymer, polyvinyl alcohol, N-methylol-acrylamide copolymer, styrene-vinyltoluene copolymer, chlorinated polyethylene, chlorosulfonated polyethylene, nitrocellulose, polyvinyl chloride, polyester, polyimide, vinyl acetate-vinyl chloride copolymer, ethylene-vinyl acetate copolymer, polyethylene, polypropyrene, polycarbonate and fluorinated polyolefin) in an appropriate solvent to prepare a coating solution, and coating the solution on the substrate. Preferred polymer materials are fluorinated polyolefin, chlorinated polyethylene and nitrocellulose, and most preferred is chlorinated polyethylene.

The thickness (average thickness) of the intermediate layer is determined in consideration of various properties required for the intermediate layer. Generally, the thickness of the intermediate layer is in the range of 100 to 1,000 angstroms.

The intermediate layer (preferably a chlorinated polyethylene layer) formed as above can reduce an escape of heat energy of the laser beam from the recording layer to the substrate caused by thermal conductivity. Further, since a gas generates from the irradiated area of the chlorinated polyethylene layer, pits are easily formed and the recording sensitivity can be highly enhanced.

The coating solution containing chlorinated polyethylene dissolved in a solvent preferably has a concentration of 0.1 to 0.4% by weight. When the concentration of the coating solution is less than 0.1 wt. %, the resulting layer hardly functions as a sensitivity-enhancing layer because the formation of pits is not easily made in the chlorinated polyethylene layer. When the concentration thereof exceeds 0.4 wt. %, the coating of the solution on the substrate cannot be made evenly, and thereby the resulting optical disc suffers sensitivity fluctuation or occurrence of burst errors.

If desired, other additional layers such as an undercoating layer can be interposed between the intermediate layer and the substrate.

On the substrate (or the intermediate layer, or other additional layer), a recording layer is provided.

Examples of the material employed for the recording layer include metals such as Te, Zn, In, Sn, Zr, Al, Cu and Ge; semi-metals such as Bi, As and Sb; semiconductors such as Ge and Si; alloys thereof; and mixtures thereof. Also employable are sulfides, borides, silicon compounds, carbides and nitrides of those metals or semi-metals; and mixtures of those compounds and metals.

The recording layer can be formed on the substrate (or an additional layer optionally provided on the substrate) by a known process such as vapor-deposition, sputtering or ion-plating using the above-mentioned materials. The recording layer may be composed of a single layer or plural layers. The thickness of the recording layer is generally in the range of 100 to 5,500 angstroms from the viewpoint of optical density required for optically recording of information. The recording layer can be a dye-type recording layer.

On the recording layer is preferably provided a protective layer. The protective layer preferably is a laminate (i.e., laminated sheet) consisting essentially of a flexible protective layer made of a flexible resin material and a rigid protective layer made of a rigid resin material. The laminate is placed on the recording layer in such a manner that the flexible protective layer faces the recording layer.

Examples of the flexible resin materials include polyurethane, polyvinylidene chloride, ethylene-vinyl acetate copolymer, a silicone rubber, a styrene-butadiene rubber and polyacrylic acid esters. The flexible resin material is coated on the recording layer by a known method such as a solution coating, a latex coating and a hot melt coating, and if desired, the coated layer is subjected to other treatments such as a drying treatment and a heat treatment,to give a flexible protective layer. The thickness of the flexible protective layer generally is in the range of 100 angstroms to 5 $\mu$m, preferably in the range of 0.3 to 3 $\mu$m.

Examples of the rigid resin materials include ultraviolet-curing resins and thermosetting resins. The rigid resin material is coated on the above-obtained flexible protective layer by a known method such as a solution coating, and if desired, the coated layer is subjected to other treatments such as an irradiation of ultraviolet rays and a heating treatment, to give a rigid protective layer. The thickness of the rigid protective layer generally is in the range of 0.1 to 10 $\mu$m, preferably in the range of 1 to 3 $\mu$m.

A thin film of an inorganic material such as silicon dioxide, tin oxide and magnesium fluoride or a polymer material such as a thermoplastic resin and a photo-curing resin may be formed on the free surface of the substrate (surface not facing the recording layer) by means of vacuum deposition, sputtering process or coating process in order to increase resistance to damage and resistance to moisture.

A recording medium of two substrates combined-type can be prepared by combining two substrates having the above-described structure using an adhesive, etc. A recording medium of air-sandwich structure can be prepared by combining two disc-shaped substrates, at least one of which having the above-described structure, by interposing therebetween a ring-shaped inner spacer and a ring-shaped outer spacer, or by utilizing protruded portions provided on one or both of the substrates.

Recording of optical information can be carried out using the above-described recording medium by the following method according to the present invention. The present invention is advantageously employed for recording signals of CD format, so that the case of recording signals of CD format will be described below.

In the first place, the information recording medium comprising a substrate (which may have an intermediate layer) having the above-mentioned radiused tracking guide and a recording layer provided on the substrate is irradiated with a light for recording the information (i.e., recording light) such as a semiconductor laser beam from the substrate side under rotation of the medium at a fixed linear speed ranging from 1.2 to 2.8 m/sec., to record signals of CD format on the recording layer. As the recording light, a semiconductor laser beam having the wavelength region of 750 to 850 nm is generally used. In the information recording medium of the invention, information can be recorded at a recording power of not more than 10 mW.

In the above-mentioned method of the present invention, tracking is extremely well controlled owing to the tracking guide.

Reproduction of the recorded information can be carried out by irradiating the medium with a semiconductor laser beam from the substrate side under rotation of the medium at the same linear speed as described above and detecting the reflected light. In the recording medium of the invention, the above-mentioned radiused tracking guide is provided on the substrate (or the intermediate layer) to obtain a high reflectance, so that the recorded information can be well read out by means of a commercially available CD player.

Examples of the present invention and comparison examples are given below, but these examples by no means restrict the invention.

EXAMPLE 1

Onto a surface of a disc-shaped polycarbonate substrate provided with pre-groove of conventional form (rectangular form) thereon by injection molding [outer diameter: 120 mm, inner diameter: 15 mm, thickness: 1.2 mm, depth of groove (corresponding to d in FIG. 2 prior to solvent treatment): 750 angstroms, width of groove at the 90%-depth position of the depth of the groove from the bottom surface of the groove (corresponding to Wu in FIG. 2): 0.97 $\mu$m, width of groove at the 10%-depth position (height) of the depth of the groove from the bottom surface of the groove (corresponding to Wl in FIG. 2): 0.43 $\mu$m, width of groove at the 50%-depth position of the depth of the groove from the bottom surface of the groove (corresponding to Wc in FIG. 2): 0.70 μm, angle between the bottom surface of the groove and the side wall of the groove (corresponding to θ in FIG. 2): 14°, refractive index: 1.57] was coated a mixture solvent (methyl ethyl ketone: cyclohexane=10:100, by volume) using a spin coater at 700 r.p.m., and the coated layer of the solvent was dried to treat the substrate with the solvent.

After the solvent treatment of the disc-shaped polycarbonate substrate, the substrate had the following values; depth of groove (indicated by d in FIG. 2): 750 angstroms, width of groove at the 90%-depth position of the depth of the groove from the bottom surface of the groove (indicated by Wu in FIG. 2): 0.97 μm, width of groove at the 10%-depth position of the depth of the groove from the bottom surface of the groove (indicated by Wl in FIG. 2): 0.43 μm, width of groove at the 50%-depth position of the depth of the groove from the bottom surface of the groove (indicated by Wc in FIG. 2): 0.70 μm, angle formed by a tangent of the bottom surface of the groove at the center position and a tangent of the side wall of the groove at the center position (indicated by θ in FIG. 2): 14°.

On the substrate treated as above with the solvent were then vapor-deposited together In, Ges and Au in the ratio of 66:22:12 (In: Ges: Au, by weight), to form a recording layer of 300 angstroms thick on the substrate.

Thus, an information recording medium (optical disc) consisting of a substrate and a recording layer was prepared.

EXAMPLE 2

Onto a surface of a disc-shaped polycarbonate substrate provided with pre-groove of conventional form (rectangular form) thereon by injection molding [outer diameter: 120 mm, inner diameter: 15 mm, thickness: 1.2 mm, depth of groove (corresponding to d in FIG. 3 prior to provision of intermediate layer): 750 angstroms, width of groove at the 90%-depth position of the depth of the groove from the bottom surface of the groove (corresponding to Wu in FIG. 3): 0.97 μm, width of groove at the 10%-depth position of the depth of the groove from the bottom surface of the groove (corresponding to Wl in FIG. 3): 0.43 μm, width of groove at the 50%-depth position of the depth of the groove from the bottom surface of the groove (corresponding to Wc in FIG. 3): 0.70 μm, angle between the bottom surface of the groove and the side wall of the groove (corresponding to θ in FIG. 3): 14°, refractive index: 1.57] was coated a 0.3 wt. % coating solution containing chlorinated polyethylene dissolved in a mixture solvent (methyl ethyl ketone: cyclohexane=10:100, by volume) using a spin coater at 700 r.p.m., and the coated layer of the solution was dried to form an intermediate layer on the substrate and simultaneously to treat the substrate with the solvent for rounding off the corner portions of the tracking guide. Thus formed intermediate layer had a thickness of 500 angstroms on the groove portion and a thickness of 300 angstroms on the land portion.

After the formation of the intermediate layer, the disc-shaped polycarbonate substrate had the following values; depth of groove (indicated by d in FIG. 3): 550 angstroms, width of groove at the 90%-depth position of the depth of the groove from the bottom surface of the groove (indicated by Wu in FIG. 3): 0.97 μm, width of groove at the 10%-depth position of the depth of the groove from the bottom surface of the groove (indicated by Wl in FIG. 3): 0.43 μm, width of groove at the 50%-depth position of the depth of the groove from the bottom surface of the groove (indicated by Wc in FIG. 3): 0.70 μm, angle formed by a tangent of the bottom surface of the groove at the center position and a tangent of the side wall of the groove at the center position (indicated by θ in FIG. 3): 14°.

On the intermediate layer were then vapor-deposited together In, Ges and Au in the ratio of 66:22:12 (In : Ges: Au, by weight), to form a recording layer of 300 angstroms thick on the intermediate layer.

Thus, an information recording medium (optical disc) consisting of a substrate, an intermediate layer and a recording layer, superposed in order, was prepared.

COMPARISON EXAMPLE 1

The procedures of Example 1 were repeated except for not treating the substrate with the solvent and directly performing the vapor-deposition for forming a recording layer on the substrate, to prepare an optical disc consisting of a substrate and a recording layer.

EVALUATION OF RECORDING MEDIUM

The optical discs obtained in Examples 1 and 2 and Comparison Examples 1 and 2 were evaluated on the level of the reflected light, sensitivity and the C/N ratio according to the following tests.

(1) Level of reflected light

The optical disc was measured on the amount of the reflected light using CD-PU evaluation device of Pulstec Co., Ltd., and the levels of the reflected lights on the groove and the land portion were calculated based on the amount of the reflected light on the mirror portion being 100%.

(2) Sensitivity

A single signal (0.72 MHz) was recorded on the optical disc at a linear speed of 1.3 m/sec. using OMS-1000 of Nakamichi Co., Ltd., and the minimum power of the laser beam capable of recording the signal was set to the recording power.

(3) C/N

The signal recorded on the optical disc in the above evaluation on the sensitivity was reproduced at RBW of 30 kHz, VBW of 100 Hz and a linear speed of 1.3 m/sec. to measure the C/N.

The results of the evaluations are set forth in Table 1.

TABLE 1

| | Level of Reflected Light (%) | | Recording Power (mW) | C/N (dB) |
|---|---|---|---|---|
| | Groove | Land | | |
| Example 1 | 88 | 92 | — | — |
| Example 2 | 89 | 92 | 10.5 | 47 |
| Com. Ex. 1 | 85 | 87 | 13.5 | 40 |

As is evident from the results set forth in Table 1, the information recording medium of the invention (Example 1) in which a tracking guide (pre-groove) having radiused corner portions and top portions of side walls in the concave groove was provided on the substrate or the information recording medium of the invention (Example 2) in which the same tracking guide was provided on the intermediate layer had a reflected light of larger amount and showed a higher sensitivity and a higher C/N ratio, as compared with the recording medium provided with a conventional tracking guide (Comparison Example 1). Accordingly, it was confirmed that the recording medium of the invention was prominently advantageous for reproducing the recorded information by means of a commercially available CD player.

I claim:

1. An information recording medium comprising a disc-shaped substrate provided with a spirally formed concave groove on its surface and recording layer for optically recording and reproducing information by means of a laser beam which is provided on the substrate, wherein both corner portions facing each other and top portions of both side walls facing each other in said concave groove are radiused, and the concave groove has a shape in the radial direction which is determined by the following formulae (I) and (II):

$$Wu > Wc + d \cdot \tan(90 - \theta) \qquad (I)$$

$$Wl < Wc - d \cdot \tan(90 - \theta) \qquad (II)$$

in which each symbol has the following meaning:
- d: depth of the concave groove from the bottom surface of the groove to the top portion of the wall of the groove;
- Wu: width of the concave groove at height of 90% of the depth of the groove from the bottom surface of the groove;
- Wl: width of the concave groove at height of 10% of the depth of the groove from the bottom surface of the groove;
- Wc: width of the concave groove at height of 50% of the depth of the groove from the bottom surface of the groove; and
- $\theta$: angle formed by a tangent of the bottom surface of the concave groove at the center position and a tangent of the side wall of the groove at the center position.

2. The information recording medium as claimed in claim 1, wherein the concave groove has a planar bottom portion.

3. An information recorded medium comprising a disc-shaped substrate provided with a concave groove of spiral form on the surface and a recording layer which is provided on the substrate, both corner portions facing each other and top portions of both side walls facing each other in said concave groove being radiused, which is recorded with information on the recording layer by locally removing a material of the recording layer to form pits or locally altering optical characteristics of the material of the recording layer.

4. An information recorded medium comprising a disc-shaped substrate provided with a spirally formed concave groove on its surface, an intermediate layer provided on its upper surface with a concave groove of essentially the same form as that on the substrate and a recording layer, superposed in order, both corner portions facing each other and top portions of both side walls facing each other in both of said concave grooves on the substrate and the intermediate layer being radiused, which is recorded with information on the recording layer by locally removing a material of the recording layer to form pits or locally altering optical characteristics of the material of the recording layer.

5. An information recording medium comprising a disc-shaped substrate provided with a concave groove of spiral form on its surface, an intermediate layer provided on its upper surface with a concave groove of essentially the same form as that on the substrate and a recording layer for optically recording and reproducing information by means of a laser beam, superposed in order, wherein both corner portions facing each other and top portions of both side walls facing each other in both of said grooves on the substrate and intermediate layer are radiused, and the concave groove has a shape in the radial direction which is determined by the following formulae (I) and (II):

$$Wu > Wc + d \cdot \tan(90 - \theta) \qquad (I)$$

$$Wl < Wc - d \cdot \tan(90 - \theta) \qquad (II)$$

in which each symbol has the following meaning:
- d: depth of the concave groove from the bottom surface of the groove to the top portion of the wall of the groove;
- Wu: width of the concave groove at height of 90% of the depth of the groove from the bottom surface of the groove;
- Wl: width of the concave groove at height of 10% of the depth of the groove from the bottom surface of the groove;
- Wc: width of the concave groove at height of 50% of the depth of the groove from the bottom surface of the groove; and
- $\theta$: angle formed by a tangent of the bottom surface of the concave groove at the center position and a tangent of the side wall of the groove at the center position.

6. The information recording medium as claimed in claim 5, wherein each of the concave grooves has a planar bottom portion.

* * * * *